May 21, 1963     H. E. JENSEN     3,090,904
BATTERY CHARGER
Filed Jan. 12, 1959
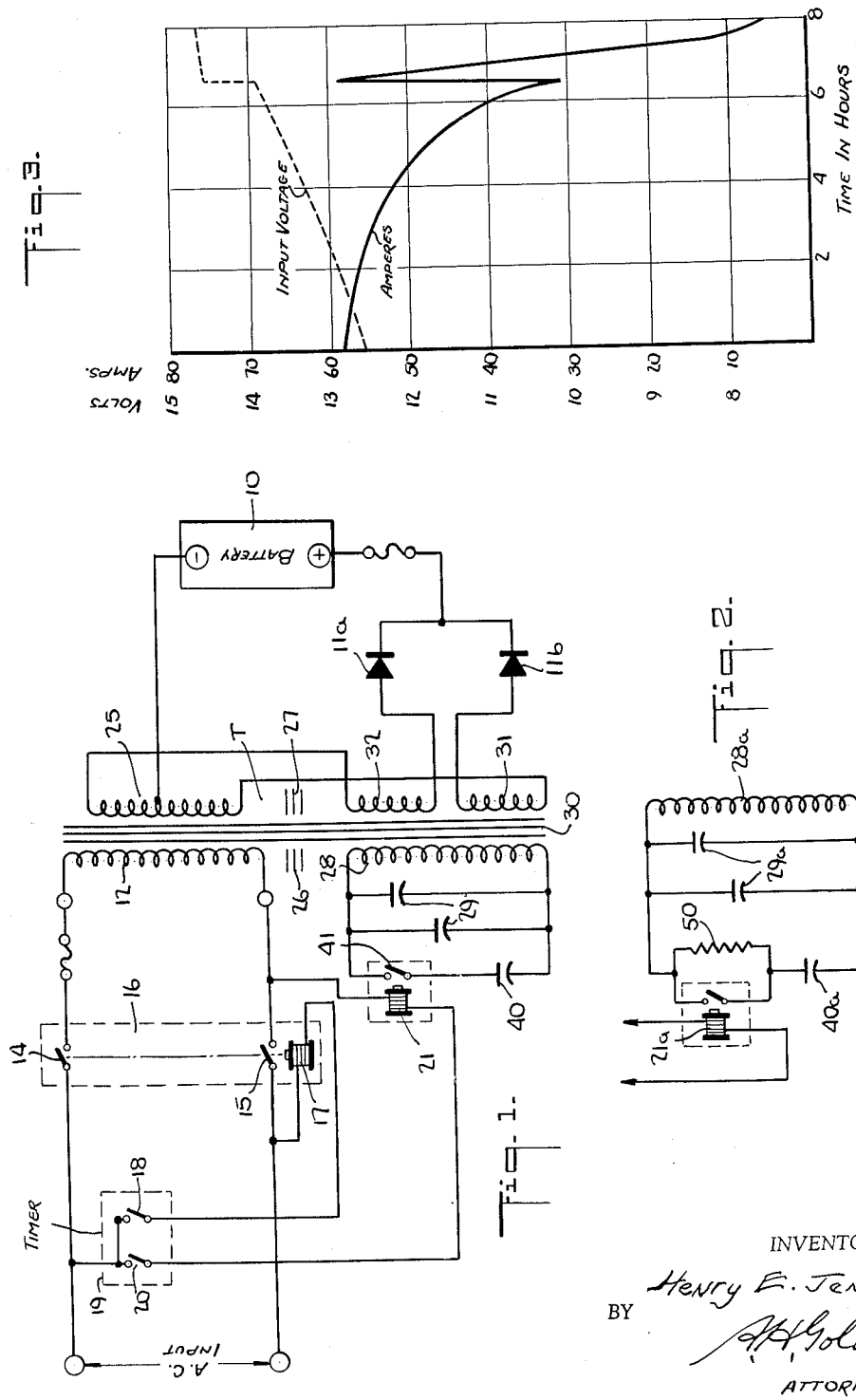
INVENTOR.
Henry E. Jensen
BY
*A. H. Golden*
ATTORNEY United States Patent Office 3,090,904
Patented May 21, 1963

3,090,904
BATTERY CHARGER
Henry E. Jensen, Norristown, Pa., assignor to C & D Batteries, Inc., Conshohocken, Pa., a corporation of Pennsylvania
Filed Jan. 12, 1959, Ser. No. 786,144
6 Claims. (Cl. 320—22)

This invention relates to battery chargers, and more particularly to a battery charger adapted for the charging of storage batteries of various capacities.

As those skilled in the art will appreciate, battery chargers of the particular class now require the use of resistors maintained in the circuit of the battery and the charger. These resistors are adjusted so that the current flowing to the battery to be charged, depending on the capacity of the battery, will bring the battery into a substantially charged condition within the required time period without gassing of the battery through the application of excess voltage thereto. Gassing of the battery will, however, take place automatically toward the end of the charging period. Thus, while the charging of the battery and the building up of the voltage thereof will gradually decrease the current flowing into the battery, the applied voltage is nevertheless sufficiently high to cause gassing during the last part of the charging cycle.

To prevent damage to the battery, a voltage sensitive relay is utilized to start a timer at or near the beginning of the gassing period, this timer in turn stopping the charging cycle after a predetermined period of time. As is obvious, this type of charging requires a ballast resistance and results therefore in undesirable heat loads. Further, this type of charging equipment requires the setting of a resistor, depending upon the size of battery, to effect substantial charging of the battery prior to the beginning of gassing. If this setting is not correct, the battery may be damaged.

I have conceived, as my invention and contribution to the art, a battery charging method and apparatus through which I eliminate completely the use of resistors in the charging circuit. Thus, the circuit will allow for only that flow of current into the battery that will charge the battery without effecting gassing of the battery. To determine the specific gravity of the battery, I require some gassing in order to effect diffusion of the electrolyte. This diffusion makes certain that the specific gravity of the electrolyte is uniform throughout the battery at the end of the charging cycle. I therefore utilize means for changing the voltage of the charging circuit near the end of the charging cycle to effect gassing.

Thus, as a feature of my invention, my charger operates at a predetermined automatically regulated voltage, set at a value just below the gassing point of the battery to allow for the most effective and efficient charging of the battery, all without use of resistors. As a further feature, a timer acts to increase this voltage during the latter portion of the charging cycle so as to produce a safe gassing of the battery and a thorough diffusion of the electrolyte so that its specific gravity may be measured.

As a still more particular feature of the invention, I prefer to utilize a battery charger having a constant potential through use of a resonant circuit. The output winding of this resonant circuit is the source of the input voltage for the battery charging current. By changing the resonance of the circuit, through the changing of the constants thereof, preferably by the addition of capacity, I naturally increase the voltage output. Since the current of this battery charger is automatically self-limiting, the charging voltage may be set at a value just below the gassing point of the battery to allow for the most effective and efficient charging. The gassing begins only when it is desired to diffuse and mix the electrolyte to obtain an effective gravity reading.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:
FIG. 1 is a circuit diagram of the battery charger of my invention;
FIG. 2 is a modification of part of the circuit of FIG. 1; and
FIG. 3 is a graph illustrating the input amperes and voltage for effecting the charging of a typical battery.

Referring now particularly to the drawings, the battery to be charged is designated by reference numeral 10 and it receives the charging current from two power rectifiers 11a and 11b. Rectifiers 11a and 11b receive their supply voltage from a constant voltage transformer indicated generally by reference letter T. Transformer T has a primary winding 12, the terminals of which extend to contacts 14 and 15 of a contacter 16, the actuating electromagnetic coil of which is designated by reference numeral 17. The circuit of coil 17 is maintained normally open and is adapted to be closed at contacts 18 through the operation of a timer 19. This timer 19 is adapted also to close the contacts 20 of an electromagnetic coil 21, for a purpose to be indicated presently.

Constant voltage transformer T has a tapped secondary winding 25, the tap of which extends to the negative terminal of the battery 10. The reluctance of the transformer is effected by magnetic shunts 26 and 27. The winding 28, which I may call an intermediate winding, is in series parallel with capacitors 29, whereby to form a resonant circuit that is brought into resonance as the flux density in magnet bar 30 is increased through the operation of the coil 12. Windings 31 and 32 are positioned over and magnetically coupled to winding 28, these windings being connected to the rectifiers 11a and 11b from which the input current for the battery charge is obtained. Windings 31 and 32 may be called load or output windings.

Regulation of the voltage in the type of transformer utilized is obtained normally through the fact that when coil 28 is brought into resonance, it will resist going out of resonance. Further, upon a load being applied to the terminals of the windings 31 and 32, coil 25 will be out of phase with windings 31 and 32. Therefore, depending upon the position of the tap in coil 25, any increase in the flow of current in coil 12, while acting to increase the flow of current in coil 28, will be offset due to the balancing action of coil 25 against windings 31, 32. In other words, the regulation is obtained not only because of the resistance of coil 28 to changing its resonance, but also by the presence of coil 25 and its offset of any increase in current flow in the output windings 31, 32.

The resonant circuit including winding 28 and capacitors 29, includes an additional capacitor 40 in series with normally open contacts 41. These normally open contacts 41 will be closed upon the energizing of coil 21 by timer 19 due to the closing of the circuit at contacts 20. Therefore, should the timer be set to close the circuit of coil 21 after a number of hours, it will do so placing the additional capacitor 40 in the resonant circuit including the winding 28. Changing of the resonance of the circuit will increase the power output of the winding 28 and therefore the power output of load or output windings 31, 32, thereby increasing the voltage being impressed on the battery 10. It is this increase of voltage that will effect the gassing of the battery as has heretofore been set forth.

In the actual operation of the invention, the timer 19 will be set so as to bring about normal operation of the circuit for a predetermined period of time, after which an increase of voltage will be effected to bring about gassing. It will be well to note that the timer 19 will first close the contacts 14 and 15 by closing the circuit of coil 17 at 18, whereupon the transformer T will be operative to supply current to windings 31 and 32 which through rectifiers 11a and 11b charge the battery 10 utilizing both portions of the alternating current cycle. Upon the end of a predetermined period of time, the timer 19 will close the circuit of coil 21 at 20, whereupon coil 21 closes the contacts at 41 to place capacitor 40 in the resonant circuit including winding 28. There will now be an increase in voltage as already set forth. Naturally, the timer will finally open the circuit at contacts 14, 15 in order to terminate the charging cycle.

Referring now to FIG. 3, the dotted line on the graph shows the input voltage and the solid line amperes of a typical charging cycle in which the battery is a 360 ampere hour battery having six cells of two volts each. The ordinate at the left represents volts and the right-hand ordinate represents amperes. The abscissa is time in hours. The voltage input at the beginning of the charging cycle is approximately 12.6, and while it may be held substantially constant, the characteristics of the commercial form of my invention allow it to increase slightly for approximately 7 hours as will be seen on the graph. At the beginning of the charging cycle, the ampere flow into the battery is approximately 58, and at the end of approximately 7 hours, the amperes have been reduced to about 30. At this point of the cycle, the voltage is increased from approximately 13.8 to 14.5. This brings about an increase of the amperes flowing into the battery as can be seen on the graph. However, the amperes now drop rapidly while the voltage increases very slightly until the normal end of the charging cycle, which is 8 hours. During this period of increased voltage, gassing of the battery will occur and the electrolyte will move about in the battery, so that there will be a uniform specific gravity easily measured by a hydrometer at the top of the battery. This will yield an accurate reading of the actual battery charge.

In FIG. 2, I illustrate a modification of the resonant circuit of my invention in which the resonant winding is now designated by reference numeral 28a instead of 28. The capacitors designated by reference numeral 29 in FIG. 1 are now designated 29a, while capacitor 40 of FIG. 1 is now designated 40a. This capacitor 40a is normally in the resonant circuit in series with a resistance 50. The resistance 50 may be readily shorted by operation of the coil 21a, this being the same coil as is designated by reference numeral 21 in FIG. 1. Obviously, this type of control will effect a change in resonance which will cause a change of magnetic flux within the transformer magnet bar core 30, bringing about an increased charging voltage impressed on the battery 10, all for the purposes hereinbefore set forth.

I now claim:

1. In a battery charger, means for determining and varying the voltage output of the charger whereby to maintain the voltage during a substantially major portion of the charging period below that voltage that effects gassing, and timing mechanism for actuating said means to increase the charging voltage substantially for a short length of time just prior to the end of the said charging period, whereby to cause gassing of the battery being charged.

2. In a battery charger, a power source, a transformer energized from said power source and having a resonant circuit as part thereof including a winding and a capacitor, an output winding magnetically coupled to said winding of said resonant circuit adapted for electrical connection with a battery to be charged, means for changing the resonance of said resonant circuit through a change in the capacity thereof whereby to increase the voltage output of said circuit and therefore the charging rate of said battery, and a timer for controlling said resonance changing means.

3. In a battery charger, a power source, a resonant circuit including a winding and a capacitor receiving power from said power source, an output winding magnetically coupled to said winding of said resonant circuit adapted for electrical connection with a battery to be charged, means for changing the resonance of said resonant circuit through a change in the capacity thereof whereby to increase the voltage output of said circuit and therefore the charging rate of said battery, and a timer for controlling said resonance changing means.

4. In a battery charger, a power source, a primary coil of a transformer receiving power from said power source, a resonant circuit including a winding and a capacitor, said winding being magnetically coupled to said primary coil, a reluctance between said primary coil and said winding, an output winding magnetically coupled to said winding of said resonant circuit and transmitting current to a battery to be charged, means for changing the resonance of said resonant circuit to increase the voltage of the current supplied by said output circuit to the battery being charged, and a timer for controlling said resonance changing means.

5. In a battery charger, a power source, a primary coil of a transformer receiving power from said power source, a resonant circuit including a winding and a capacitor, said winding being magnetically coupled to said primary coil, a reluctance between said primary coil and said winding, an output winding magnetically coupled to said winding of said resonant circuit, a rectifier in the circuit of said output winding for transmitting current to a battery to be charged, means for changing the resonance of said resonant circuit to increase the voltage of the current supplied to said rectifier, and a timer for controlling said resonance changing means.

6. In a battery charger, a power source, a primary coil of a transformer receiving power from said power source, a resonant circuit including a winding and a capacitor, said winding being magnetically coupled to said primary coil, a reluctance between said primary coil and said winding, an output winding magnetically coupled to said winding of said resonant circuit, a rectifier in the circuit of said output winding for transmitting current to a battery to be charged, a control winding magnetically coupled to said primary coil and in series with said output winding, means for changing the resonance of said resonant circuit to increase the voltage of the current supplied to said rectifier, and a timer for controlling said resonance changing means.

References Cited in the file of this patent

UNITED STATES PATENTS

| | | |
|---|---|---|
| 1,786,280 | Woodbridge | Dec. 23, 1930 |
| 2,436,925 | Haug et al. | Mar. 2, 1948 |
| 2,621,317 | Ihrig | Dec. 9, 1952 |
| 2,855,508 | Barlow et al. | Oct. 7, 1958 |
| 2,857,479 | Kummer | Oct. 21, 1958 |